United States Patent [19]

France et al.

[11] Patent Number: 4,856,868
[45] Date of Patent: Aug. 15, 1989

[54] CABLES COMPRISING OPTICAL FIBRES OF HALIDE GLASS

[75] Inventors: Paul W. France; Steven F. Carter; Martin W. Moore, all of Ipswich, England

[73] Assignee: British Telecommunications public limited company, Great Britain

[21] Appl. No.: 157,569

[22] Filed: Feb. 19, 1988

[30] Foreign Application Priority Data

Feb. 24, 1987 [GB] United Kingdom ............... 8704217

[51] Int. Cl.⁴ .............................................. G02B 6/44
[52] U.S. Cl. .............................. 350/96.23; 350/96.34
[58] Field of Search ............... 350/96.23, 96.29, 96.30, 350/96.32, 96.34; 523/173

[56] References Cited

U.S. PATENT DOCUMENTS

| | | | |
|---|---|---|---|
| 3,920,980 | 11/1975 | Nath | 350/96.32 X |
| 4,370,023 | 1/1983 | Lange et al. | 350/96.23 |
| 4,497,538 | 2/1985 | Patel | 350/96.23 |
| 4,743,085 | 5/1988 | Jenkins et al. | 350/96.23 |

Primary Examiner—John D. Lee
Attorney, Agent, or Firm—Nixon & Vanderhye

[57] ABSTRACT

An optical fibre cable for radiation monitoring, e.g. remote spectroscopy, has the fibres immersed in a water miscible liquid such as ethylene glycol or isopropanol. It has been found that water miscible liquids protect even fluoride fibre against attack by water, e.g. water which diffuses into the bore of a cable during its useful life.

13 Claims, 1 Drawing Sheet

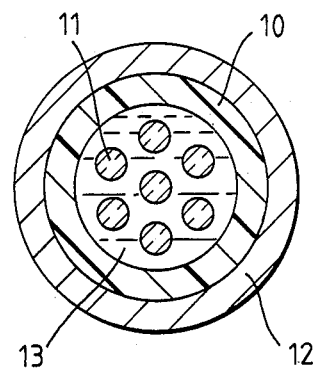

CABLES COMPRISING OPTICAL FIBRES OF HALIDE GLASS

This invention relates to cables which contain one or more optical fibres, eg. fibres formed of a halide glass.

Optical fibres, usually as bundles of 1 to 1000 fibres, are used for remote radiation monitoring, eg at distances of 1 m to 100 m. Examples of radiation monitoring include remote measurement of ambient radiation, eg. in furnaces or the like, as well as monitoring of artificial radiation, eg for remote spectroscopy and for endoscopes. Where artificial radiation is used optical fibres are a convenient means for supplying the radiation, eg in a separate bundle or in a single bundle comprising both supply and return fibres.

Radiation monitoring should be distinguished from telecommunications which requires transmission over much longer distances, eg many kilometers. Thus telecommunications requires extremely low attenuations using monomode fibre to minimise dispersion. Radiation monitoring can tolerate much higher attenuations than telecommunications because its distances are shorter. Furthermore radiation monitoring usually employs multimode fibre with high numerical aperture to facilitate the collection of the radiation.

Radiation monitoring utilises cables which comprise one or more fibres enclosed in a flexible sheath, eg a plastics tube. Fibres formed of halide glasses are particularly suitable, and especially fluoride glasses, because they have a wide transmission window, eg 0.5-5 micrometers. However, they are very susceptible to damage by water (as liquid or vapour). The water may be present when the fibres are first located in the sheath or it may gain access during the life of the cable. Although the cable is sealed, the wall of the sheath may be sufficiently porous to permit the admission of undesirable amounts of water vapour.

It has been proposed to include dessicants in silica telecommunications fibre because even very small quantities of water may contaminate the silica with hydroxyl and hence cause an unacceptable increase in stress corrosion. However the incorporation of the dessicants into fibre bundle such as are used for radiation monitoring is difficult.

According to this invention, an optical cable comprising one or more optical fibres, eg halide glass and preferably fluoride glass fibres, located inside a tubular sheath includes a protective liquid capable of dissolving at least 1%, preferably at least 5%, of its own weight of water; the fibres being immersed in the liquid which is contained in the sheath. Preferably the liquid substantially fills the bore. Protective liquids which are miscible with water in all proportions are particularly suitable.

The physical properties of the liquid should be such that it will remain in the liquid state at the temperatures and pressures expected to be encountered during use. Thus it is preferred that the liquid remain in the liquid state at all temperatures between 0° C. and 80° C. It may be necessary to take intended temperature range into account, eg if a protective liquid with a freezing point below −50° C. is required it may be necessary to limit the high temperature availability.

Organic liquids having molecules with hydrophyllic groups such as hydroxyl are particularly suitable. Examples of suitable hydroxy compounds include compounds having a hydrocarbon chain, optionally interrupted by ether bridges and/or having halogen substituents. The preferred compounds include alkane diols and alkanols, eg 1,2-ethanediol and the propanols.

A cable according to the invention will now be described by way of example with reference to the drawing which shows the cable in cross section.

The cable comprises a flexible plastics, eg polyethylene or PTFE, tube 10 which contains a bundle of fluoride glass fibres 11 immersed in a protective liquid 13. The cable is protected by armouring 12 which surrounds the tube 10.

The protective liquid 13 substantially fills the bore of the tube 10 (or, at least, that part not occupied by the fibres 11) and the fibres 11 are immersed in the liquid 13. The fibre is inert to the protective liquid 13, ie. the liquid does not cause unacceptable deterioration of the optical properties during the life of the cable. (It would be very difficult to fill a tube completely with the protective liquid and, in any case, it is desirable to leave a small vapour space to allow for thermal expansion and contraction.)

In addition, the protective liquid 13 dissolves any water which may originally be present in the bore or which gains access to the bore during the life of the cable. Since there is very little water in either category the protective liquid 13 only needs a capacity to dissolve very little water, eg. 0.1% of its own mass of water. Liquid which have higher solubilities, eg capacities of over 5% are readily available—in fact liquids miscible with water in all proportions are readily available.

We have found that even the "wet" liquids (ie after dissolving water present in the cable) are effective to keep damage at acceptable levels. In particular we have found that the use of water miscible protective liquids is more convenient than attempting to dry the contents of the cable, eg by desicants. The liquids are relatively easy to handle and to introduce into the cable.

We have prepared cables using the following as the protective liquid 13:

|  | M.Pt. | B.Pt. |
| --- | --- | --- |
| 1,2-ethanediol | −11.5° C. | 198° C. |
| iso-propanol | −89.5° C. | 82.4° C. |

As mentioned above, during the life of a cable the protective liquid 13 will dissolve some water whereby the fibre will be in contact with a 'wet' liquid. Thus the fibre may be in contact with a mixture of 98% organic liquid and 2% water. It is therefore important to recognise that these 'wet' liquids do not cause an unacceptable reduction in the useful life of the fibre.

By way of demonstration, a length of fibre based on a fluoride glass comprising about 50 mole % of $ZrF_4$ was submerged in a 'wet' solution and sorted for one week at room temperature, ie. about 30° C. The 'wet' solution consisted of 95%wt of isopropanol and 5%wt water. There was no observable effect on the fibre and this observation permits the conclusion that the substantially lower concentrations of water to be expected in use will not substantially reduce the life of a cable. A second length of fibre was stored for four months in dry ethylene glycol. Its breaking strain had fallen from about 2.1% to about 1.8%. Stored in ambient air the breaking strain would have fallen to below 1%.

We claim:

1. An optical fibre cable comprising one or more optical halide fibres contained inside the bore of a tubular sheath and immersed in a protective liquid which is capable of dissolving at least 1% of its own weight of water.

2. A cable according to claim 1, wherein the protective liquid is capable of dissolving at least 5% of its own weight of water.

3. A cable according to claim 2, wherein the protective liquid is miscible in all proportions with water.

4. A cable according to claim 3, wherein the protective liquid is contaminated with water but not more than 5% by weight of water.

5. A cable according to any one of the preceeding claims, wherein the protective liquid is an organic liquid having alcoholic functional groups to confer the water miscibility.

6. A cable according to claim 4, wherein the protective liquid is selected from alkanols and alkane diols.

7. A cable according to any one of the preceeding claims 1, 2, 3 or 4, wherein the protective liquid is in the liquid phase at least over the temperature range 0° C. to 150° C. under a pressure of one atmosphere.

8. A cable according to claim 7, wherein the protective liquid is $HOCH_2 CH_2OH$.

9. A cable according to any one of claims 1, 2, 3 or 4 wherein the protective liquid is in the liquid phase at least over the temperature range $-50°$ C. to $+50°$ C. under one atmosphere of pressure.

10. A cable according to claim 9, wherein the protective liquid is a propanol.

11. A cable according to any one of the preceeding claims 1, 2, 3 or 4, wherein the sheath contains a bundle of multimode, halide glass fibres, each of said fibres having a numerical aperture in the range 0.1 to 0.4.

12. A cable according to claim 11, wherein the fibres are fluoride glass fibres.

13. An optical fibre cable comprising:
a bundle of optical halide glass fibres including at least a portion made from fluoride glass and therefore susceptible to catastrophic damage if exposed at all to water;
a flexible sheath surrounding said bundle of halide fibres; and
a protective organic liquid filling a substantial portion of the interstices between said fibres and said sheath, said liquid including dissolved water therein and being capable of continuing to dissolve further water thereinto over the life of said cable thereby protecting said halide glass fibres from catastrophic damage due to water exposure even though the liquid itself is at all times contaminated with dissolved water.

* * * * *